Figure 1:
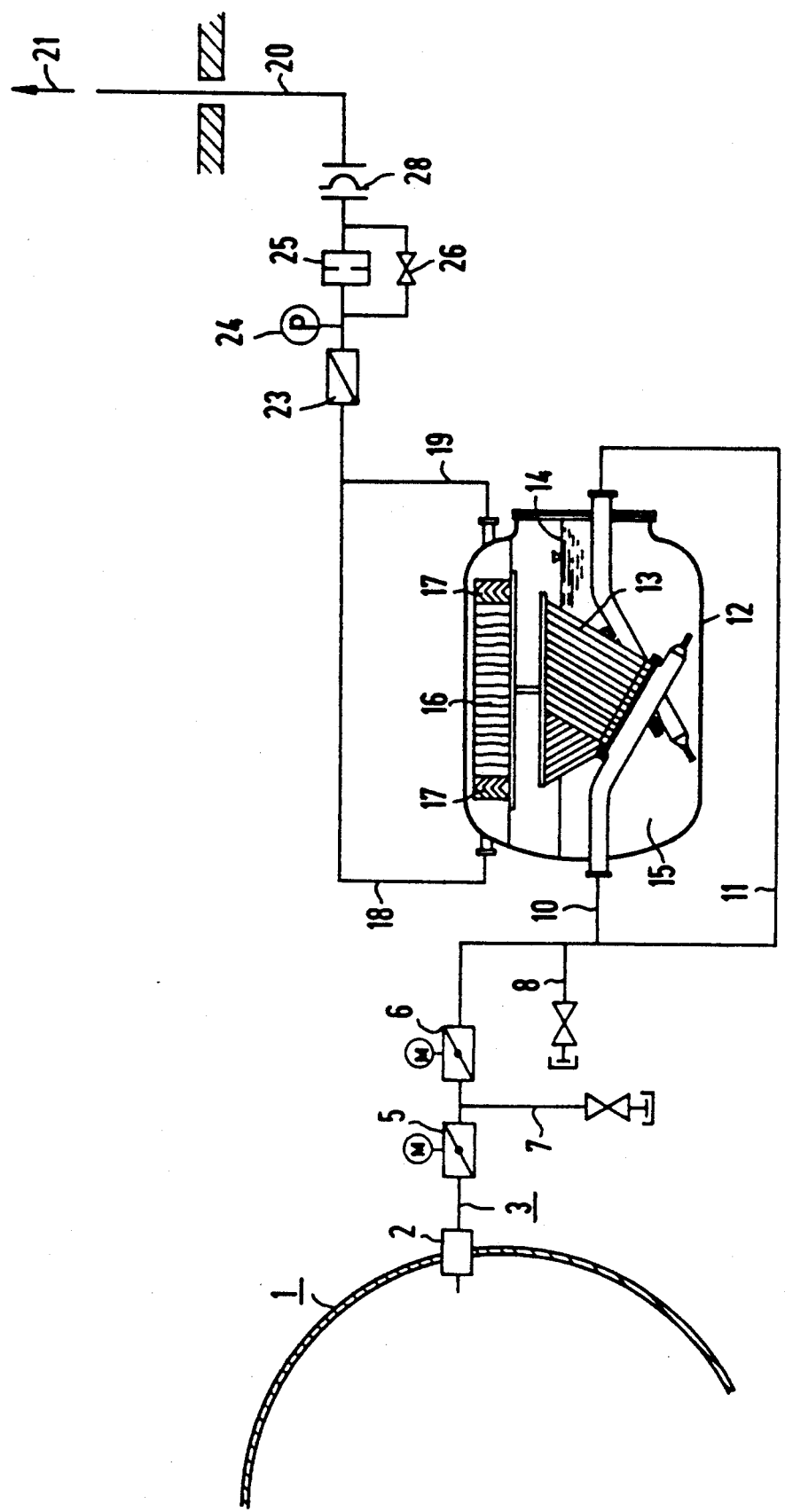
Figure 2:
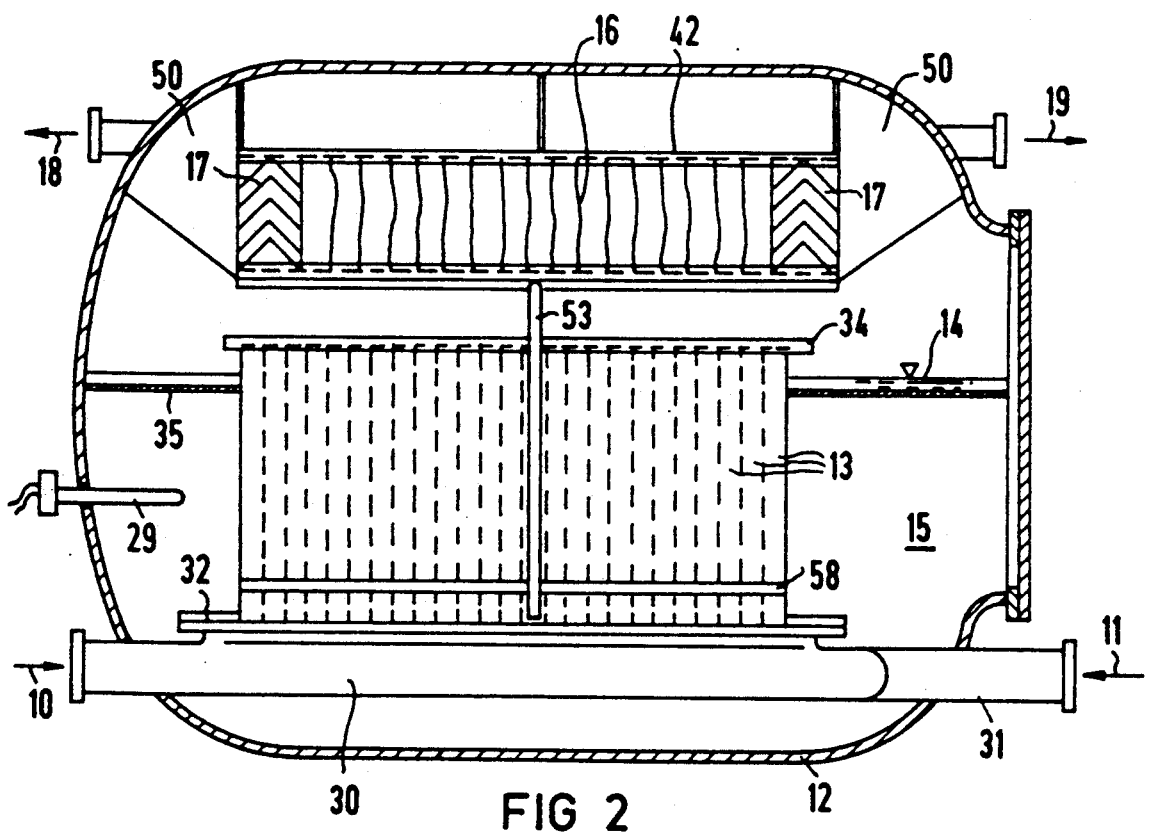

United States Patent [19]

Eckardt

[11] Patent Number: 5,017,331
[45] Date of Patent: May 21, 1991

[54] NUCLEAR POWER PLANT HAVING A CONTAINMENT

[75] Inventor: Bernd Eckardt, Bruchkoebel, Fed. Rep. of Germany

[73] Assignee: Siemens Aktiengesellschaft, Munich, Fed. Rep. of Germany

[21] Appl. No.: 335,699

[22] Filed: Apr. 10, 1989

[30] Foreign Application Priority Data

Apr. 18, 1988 [DE] Fed. Rep. of Germany ....... 3812893

[51] Int. Cl.$^5$ .............................................. G21C 19/42
[52] U.S. Cl. .................................... 376/313; 376/283; 261/126; 261/DIG. 54
[58] Field of Search ................ 376/313, 283; 261/126, 261/DIG. 54

[56] References Cited

U.S. PATENT DOCUMENTS

| | | | |
|---|---|---|---|
| 4,276,863 | 6/1981 | Lackey et al. | 55/84 |
| 4,859,405 | 8/1989 | Squarer et al. | 376/299 |
| 4,863,677 | 9/1989 | Eckardt | 376/313 |
| 4,873,050 | 10/1989 | Eckardt | 376/283 |
| 4,927,596 | 5/1990 | Minnick | 376/283 |

Primary Examiner—Stephen J. Lechert, Jr.
Assistant Examiner—N. Bhat
Attorney, Agent, or Firm—Herbert L. Lerner; Laurence A. Greenberg

[57] ABSTRACT

A nuclear power plant includes a containment for the retention of radioactivity having an overpressure safety outlet. A filter connected to the outlet includes a vessel for receiving a scrubbing liquid up to a given liquid level, a venturi scrubber disposed in the vessel having an outlet disposed above the given liquid level, an impact plate disposed at the outlet of the venturi scrubber for mist collection, a metal-fiber filter downstream of the venturi scrubber having at least first and second layers with a thickness of from 10 to 20 mm, the first layer being a moisture collector with a fiber thickness of from 8 to $20\mu$ and the second layer being an aerosol collector with a fiber thickness of from 2 to $7\mu$, and a mist collector downstream of the metal-fiber filter. The vessel has a top with a gas outlet downstream of the mist collector. A stack is connected to the gas outlet and leads to the atmosphere.

17 Claims, 5 Drawing Sheets

NUCLEAR POWER PLANT HAVING A CONTAINMENT

The invention relates to a nuclear power plant having a containment for retaining radioactivity and an outlet serving as overpressure safety means, which leads out of the containment into the atmosphere through a filter. The filter includes a venturi scrubber in a vessel containing a scrubbing liquid, a fiber filter, and a mist collector preceding it, and the top of the vessel has a gas outlet that leads into a stack.

Nuclear power plants of the above-mentioned type are known from allowed U.S. application Ser. No. 118,751 filed Nov. 5, 1987 and U S. application Ser. No. 171,656 filed Mar. 22, 1988.

However, such devices have a limited pressure relief with a low retention of radioactivity and a structural expense and size of the components which is quite large.

It is accordingly an object of the invention to provide a nuclear power plant having a containment, which overcomes the hereinafore-mentioned disadvantages of the heretofore-known and devices of this general type and which improves the pressure relief of the containment by means of a special construction and disposition of the venturi scrubbers and fiber filters, so that radioactivity retention is increased, while the structural expense, in particular the size of the fixtures used, is decreased.

With the foregoing and other objects in view there is provided, in accordance with the invention, a nuclear power plant, comprising a containment for the retention of radioactivity having an overpressure safety outlet; a filter connected to the outlet including a vessel for receiving a scrubbing liquid up to a given liquid level, a venturi scrubber disposed in the vessel having an outlet disposed above the given liquid level, an impact plate disposed at the outlet of the venturi scrubber for mist collection, a metal-fiber filter downstream of the venturi scrubber having at least first and second layers with a thickness of from 10 to 20 mm, the first layer being a moisture collector with a fiber thickness of from 8 to 20 $\mu$ and the second layer being an aerosol collector with a fiber thickness of from 2 to 7 $\mu$, and a mist collector downstream of the metal-fiber filter, the vessel having a top with a gas outlet downstream of the mist collector: and a stack connected to the gas outlet and leading to the atmosphere.

In accordance with another feature of the invention, there is provided a drainage layer from 5 to 10 mm thick disposed downstream of the aerosol collector, the drainage layer being formed of fibers having fiber thicknesses of from 8 to 20 $\mu$.

In accordance with a further feature of the invention, the venturi scrubber has two inlet regions in scrubbing liquid below the given liquid level, being mutually spaced apart in flow direction by a given spacing.

In accordance with an added feature of the invention, the venturi scrubber has a given throat width, and the given spacing is at least twice the given throat width.

In accordance with an additional feature of the invention, there are provided other venturi scrubbers, all of the venturi scrubbers being disposed at different heights in scrubbing liquid in the vessel.

In accordance with yet another feature of the invention, there is provided a pipe being inclined relative to the horizontal, the venturi scrubbers being in the form of venturi nozzles attached to the pipe.

In accordance with yet a further feature of the invention, the venturi nozzles extend at right angles to the pipe at an inclination relative to the vertical.

In accordance with yet an added feature of the invention, there is provided a another pipe inclined differently than the first-mentioned pipe, the pipes being disposed beside one another in the vessel.

In accordance with yet an additional feature of the invention, the venturi scrubbers have different lengths and terminate in the same horizontal plane.

In accordance with still another feature of the invention, the vessel is a horizontal cylindrical vessel with a given maximum horizontal vessel width, the given liquid level is a maximum fill level, and the outlet of the venturi scrubber is disposed in the vicinity of the given maximum horizontal vessel width.

In accordance with a concomitant feature of the invention, there is provided at least one other metal-fiber filter for absorbing flow forces, the metal-fiber filters being joined together in pairs.

In the invention, the stream of gas and steam (outlet stream) that emerges upon pressure relief is cleansed of aerosols with an effectiveness of $\geq 99\%$ and of elemental iodine with an effectiveness of $\geq 99\%$, yet has a particularly compact structure. This is carried out simply and therefore inexpensively by means of a freely blowing off, passively operated venturi configuration, directly followed by deep-bed metal-fiber elements with moisture collection.

The outlet stream is carried into the venturis from the containment by means of the overpressure serving as operating pressure, and the scrubbing liquid is fed passively into the immersed high-speed zone of the containment Operation should be carried out in the speed range of $\geq 50$ m/s, where very effective aerosol trapping is attained With low gas throughputs in the speed range of $< 50$ m/s, the aerosol trapping rate drops, so that a retention of only 90 to 95% is effected. The gas stream, mixed with entrained droplets and remaining aerosols, is therefore demoisturized and recleaned in a deep-bed superfine fiber filter mat. The combination venturi and deep-bed fiber filter functions in such a way that particularly at low throughputs, the reduced venturi collection performance is fully compensated for by the lengthened filter dwell times. Therefore, high filter efficiencies with decontamination factors of $\geq 100$ are attained. Thus without additional regulation of performance, a constantly high aerosol collection rate of $\geq 99\%$ is attained.

In order to improve the iodine collection rate, a second scrubbing liquid feed can be provided in the flat or round venturis used, and the feeds can be spaced apart by from $\geq 2$ times the throat width. In this range, the throat width is advantageously increased by from 5 to 20%. By means of this additional venturi stage, a scrubbing liquid entrainment higher by a factor of 2 and thus a correspondingly doubled mass transfer surface area for iodine absorption are attained, which is important particularly with short venturi dwell times. This embodiment according to the invention is also advantageous regardless of the level of scrubbing liquid.

For durable iodine retention, the scrubbing liquid can be alkalized or mixed with reducing agents.

At an extremely low load (for instance 20% of designated throughput), an additional circulation of scrubbing liquid is established through the second venturi stage, because the droplets fall back down again. Due to this mode of operation, a circulation/exchange of scrubbing liquid in the venturi itself is made possible, in order to compensate for the reduced output of scrubbing liquid through the end of the venturi.

The free blow-off is also advantageous, because it prevents a rise of scrubbing liquid through the outlet stream (bubbles rising). The venturis are followed by impact collectors for the collection of scrubbing liquid. The deep-bed metal-fiber filters are preferably constructed as flat deep-bed filters or filter columns with decreasing fiber diameters in the range from 2 to 20 um. The metal fibers can be fastened in metal filter frames by crimping or by metal encapsulation.

Gravity mist collector elements for fine filtration of entrained droplets are advantageously installed in such a way that they are integrated directly on the filter or are located at the end of the filter lanes. The collected liquid continues to provide for a continuous flushing of the aerosols out of the filters back into the scrubbing liquid. However, in order to avoid excessive condensation upon startup, the scrubbing liquid can advantageously also be preheated.

Since the venturi/scrubbing liquid configuration does not need to be very high, it is possible to accommodate this unit in a horizontal pressure vessel, which in terms of internal pressure load is optimally cylindrical. Another advantage is that upon startup, and with the scrubbing water being warmed up by entering condensing steam approximately halfway up (approximately at the upper edge of the venturi), the maximum surface area is also available, so that only a slight rise in the level of the liquid occurs. Reductions in the liquid level are possible down to just above the venturi slit, so that regulation of scrubbing liquid becomes necessary only after operating times of more than 24 hours. By placing the venturis at slightly different depths in the scrubbing water, the partial-load behavior of the venturis can be even further improved.

The metal-fiber flat filters are preferably disposed in pairs and braced against one another, so that stresses from continuous or suddenly occurring flow forces can be mutually absorbed. The filter columns are preferably horizontally disposed, with mist collectors connected directly following them.

The venturi and filter apparatus is put into operation by opening the containment closure fixtures, or by opening a bursting disk. Especially for low-pressure containments, the combination of this scrubbing apparatus with required operating pressures of $\leqq 0.3$ bar and pipelines and fixtures that are favorable in the event of pressure loss makes optimal pressure reduction possible.

An overpressure in the scrubbing apparatus can also be produced, however, by means of a throttle located in the outlet line, which makes it possible to make the apparatus smaller in size.

Other features which are considered as characteristic for the invention are set forth in the appended claims.

Although the invention is illustrated and described herein as embodied in a nuclear power plant having a containment, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a fragmentary, diagrammatic, cross-section view and a schematic circuit diagram of a pressure relief apparatus according to the invention for the containment of a boiling water reactor;

FIGS. 2 and 3 are cross-sectional views at right angles to one another, of a pressure vessel with a venturi scrubber and filter;

FIGS. 4 and 5 are views similar to FIGS. 2 and 3, of a different pressure vessel with a venturi scrubber and filter;

FIG. 6 is an elevational view of a venturi scrubbing configuration on an enlarged scale;

FIG. 7 is an elevational view of another venturi scrubber configuration on an enlarged scale; and FIGS. 8 and 9 are further enlarged elevational views of a venturi nozzle with two inlet regions, one shown at full load to half load, and the other at partial load to less than 20% of full load.

Referring now to the figures of the drawing in detail and first, particularly, to FIG. 1 thereof, there is seen a containment 1 of an otherwise non-illustrated boiling water reactor, in the form of a steel sphere A pipeline duct 2 is provided in the wall of the containment and a relief line 3 originates at the duct. Located in the course of the relief line are two identical motor-driven shutoff valves 5 and 6, between which an inspection fitting 7 is provided for ascertaining tightness and leakage. The rated width of the relief line 3 is 250 mm. In order to render the contents inert, nitrogen, for example, can be fed in through a fitting 8.

The relief line 3 has two branches 10 and 11 which lead to opposite sides of a horizontal cylindrical pressure vessel 12, in which venturi scrubbers 13 protrude through the surface or level 14 of a scrubbing liquid 15. Metal-fiber filter elements 16 are mounted above the venturi scrubbers 13 and are followed by mist collectors 17. Parallel branches 18 and 19 lead from the mist collectors to an outlet line 20, which leads to a stack represented by arrows 21.

The outlet line 20 begins with a check valve 23, which is followed by a pressure measurement location 24. In an ensuing throttle restriction 25, care is taken to ensure that the parts of the pressure relief apparatus preceding the vent line 20, in particular the venturi scrubbers 13 and the filters 16, are operated with sliding or variable pressure, so that a maximum throughput is always attained. A shutoff valve 26 is connected parallel to the throttle restriction 25. The shutoff valve is followed by a bursting disk 28, which is adapted to the rated width of 250 mm of the blow-off or outlet line 20.

In the embodiment of FIGS. 2 and 3, the pressure vessel 12 having the venturi scrubber 13 is shown in greater detail. In that embodiment, preheating for startup can be performed by means of an electric heating cartridge 29. It will be appreciated that the branches 10 and 11 of the relief line 3, which are represented by arrows, lead to two straight pipe segments 30 and 31 disposed horizontally and parallel to one another, on which the venturi scrubbers 13 are secured in two rows and inclined laterally away from one another, with a flange 32 at a right angle to the axis of the pipe. A blow-off opening 33 of the venturi scrubbers 13 protrudes outward above the water surface 14 as far as an impact plate 34 serving as a mist collector. Just below the water surface 14, which is located slightly above half the height of the vessel 12 and thus in the vicinity of the greatest horizontal width, a sieve plate 35 is provided, which serves to make the flow conditions in the vessel 12 uniform.

Figure 3:
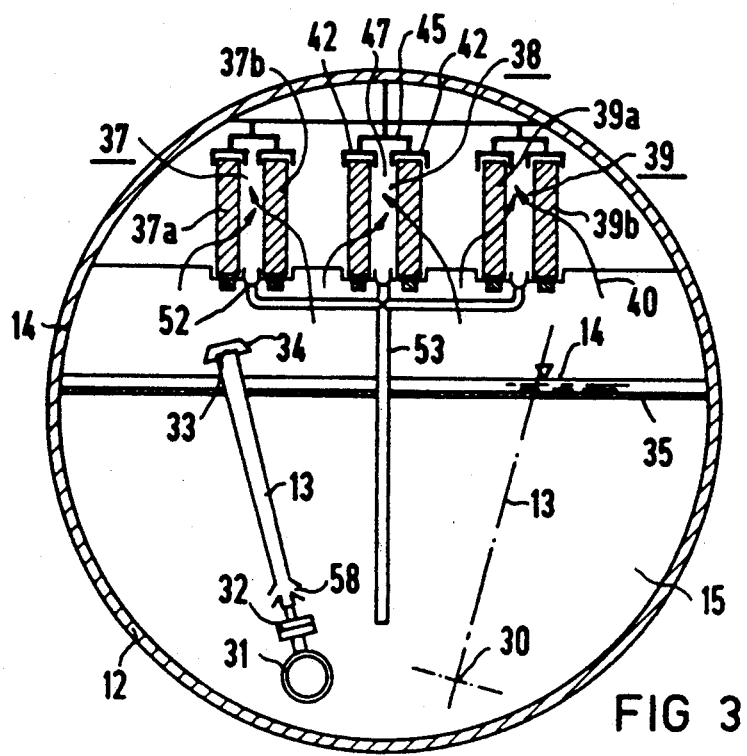

FIG. 3 shows that the metal-fiber filters 16 and the mist collectors 17 are constructed in the form of three flat filters 37, 38 and 39 extending in the longitudinal direction of the vessel 12, each filter being formed of two parallel strips a and b. The strips disposed with a vertical orientation are braced against one another, so that the stresses from flow forces can be mutually absorbed over a short distance The flow through them is from the outside in, in the direction of arrows 40. Frames 42 of the filter strips a, b each include three metal-fiber layers having a thickness of between 5 and 20 mm. The fiber thickness varies. For the inner layer, it is from 2 to 7 and preferably 4 $\mu$, while for the outer layers fiber thicknesses between 8 and 20 $\mu$, in particular between 12 and 15 $\mu$, are provided. The frames 42 of the strips a, b are connected at the top by cap plates 45. A thus-enclosed interior chamber 47 leads at the ends to collectors 50, to which the outlet lines 18 and 19 which are represented by corresponding arrows, are connected A liquid outlet line 53 leads through the sieve plate 35 into the lower region of the liquid volume 15 from the underside or bottom 52 of the filter elements 37, 38, 39.

Figure 4:
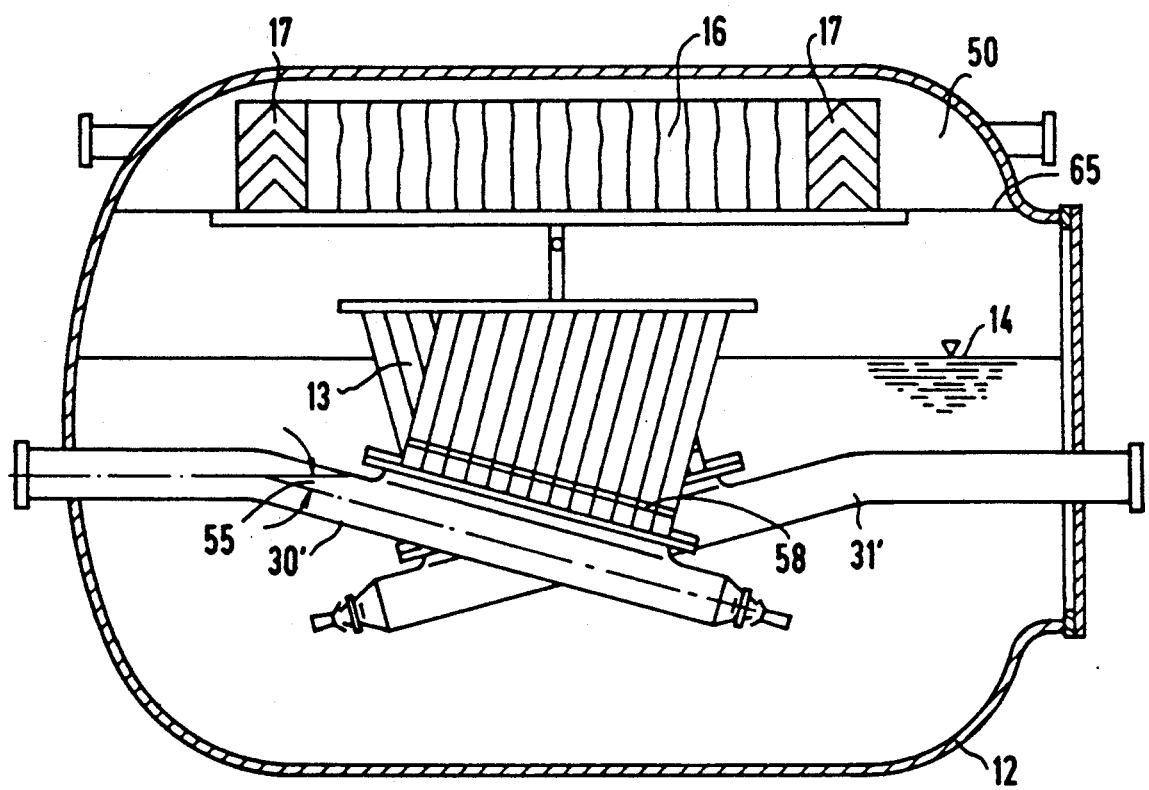
Figure 5:
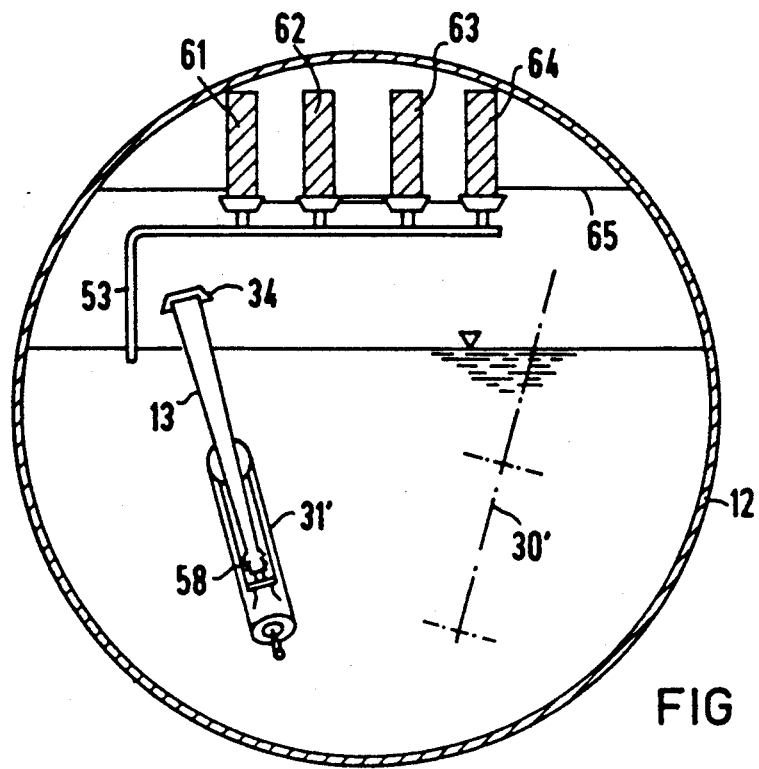

According to a variation of the venturi scrubbers 13 shown in FIGS. 4 and 5, pipes 30' and 31' are inclined by an angle 55 of approximately 5° to 15° from the horizontal. The venturi nozzles 13 are flanged at right angles to the inclined pipes 30', 31' in such a way that inlet openings 58 thereof are located at different heights beneath the liquid level 14. The lengths of the venturi nozzles 13 are graduated in such a way that they protrude to the same height in the direction toward the common impact plate 34, which extends in a straight line in the horizontal direction, as can be seen in FIG. 4.

In this case, the filters 16 are constructed with four segments 61, 62, 63 and 64 joined in pairs, which in turn have a stratification of various metal-fiber thicknesses according to the invention and are mounted on a plate 65, which walls off the collectors 50 at the bottom.

Figure 6:
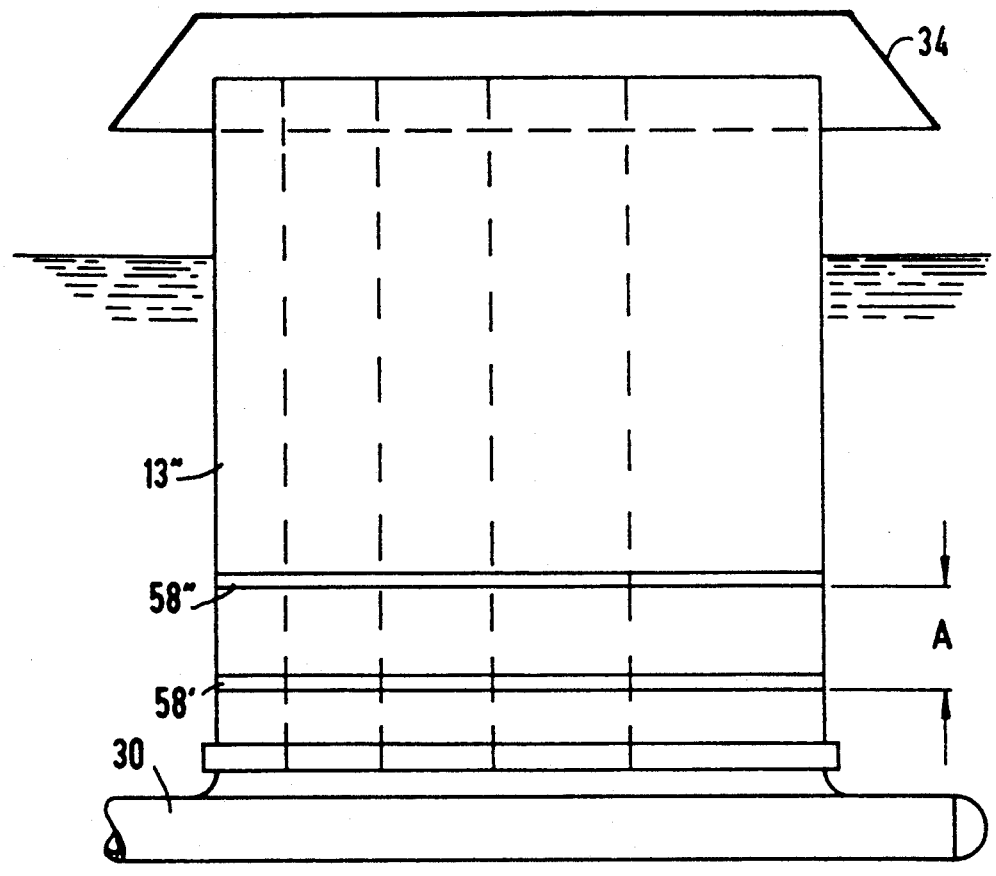

In FIG. 6, which is a portion of the device shown on a larger scale, flat venturi tubes 13'' rise upward at a right angle from the pipe 30. As the drawing shows, the lengths of the flat venturi tubes 13'' vary in the direction of the pipe 30. They may, for instance, be staggered at a ratio of 1:1.5:2:3:6. Two inlet slits 58' and 58'' are provided one above the other. A spacing A between the slits 58', 58'' is five times the throat width, for example.

Figure 7:
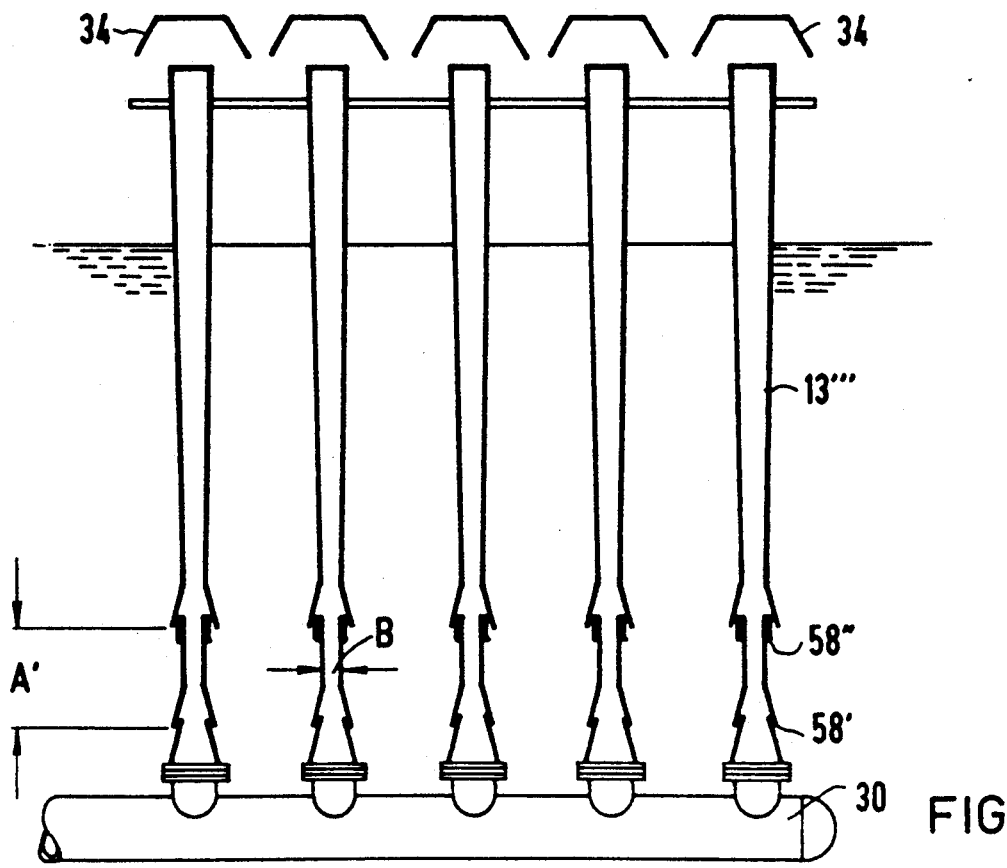

The round venturi nozzles 13''' which extend upward at right angles from the pipeline 30 as shown in FIG. 7, are spaced apart equally from one another and also have two inlet zones 58' and 58''. A spacing A' of the inlet zones 58', 58'' is three times the throat width B.

Figure 8:
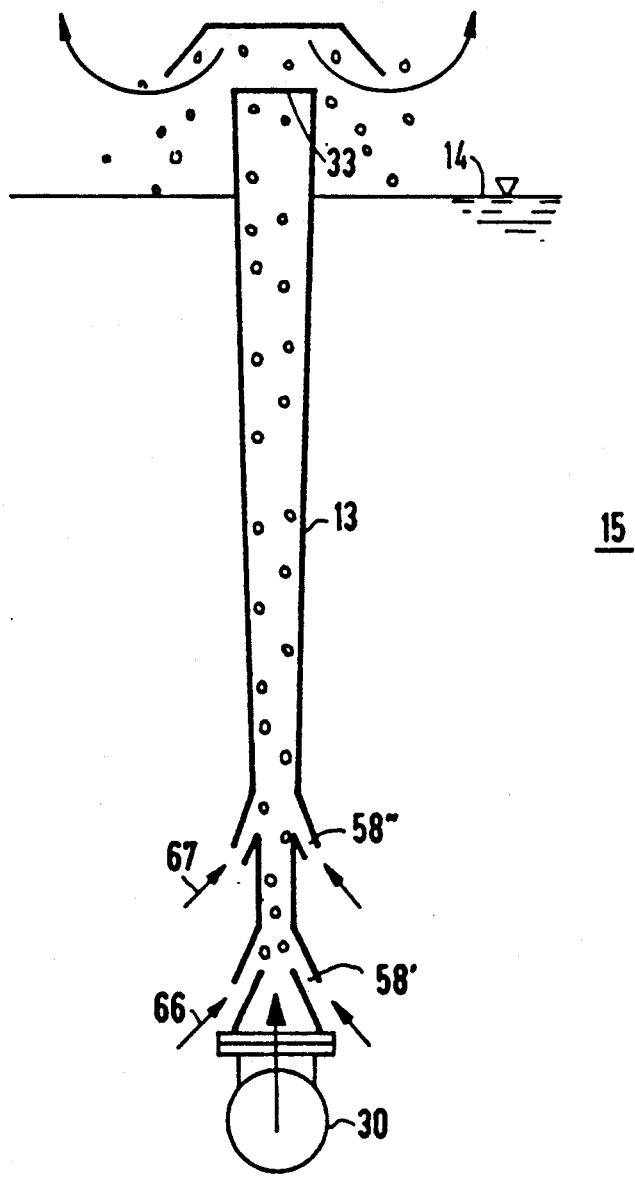
Figure 9:
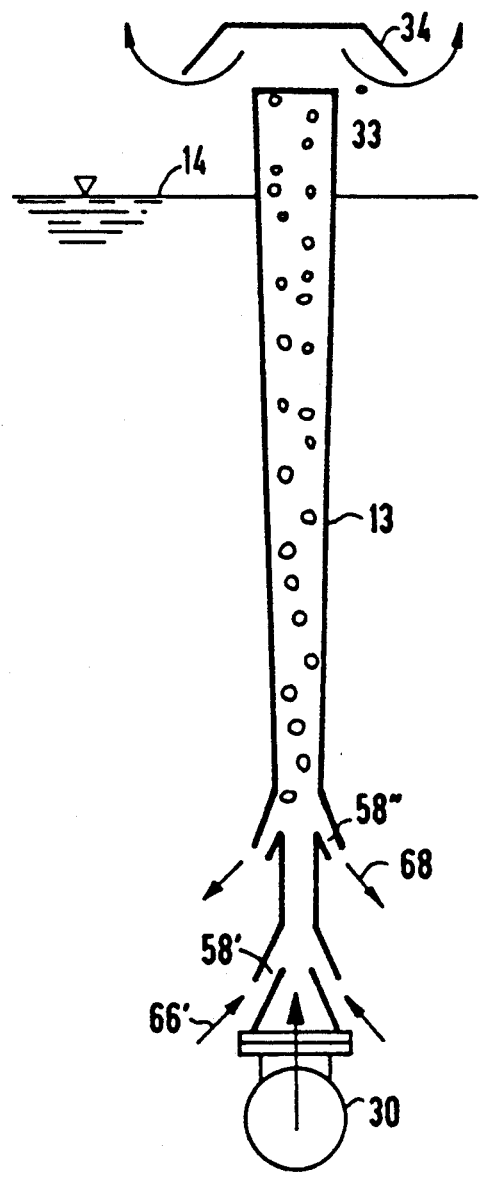

FIGS. 8 and 9 illustrate different modes of operation of the two inlet regions 58', 58'' when the load on the venturi nozzles 13 differs. FIG. 8 shows operation in the range between half load (50%) and full load. In that state, scrubbing liquid 15 is aspirated in the same manner through the inlet regions 58' and 58'', as indicated by arrows 66 and 67. However, at a still lower load, for instance at a partial load of 20% of full load, a looped operation occurs in which scrubbing liquid 15 enters only in the region 58' as indicated by an arrow 66'. The slit region 58'', located above it already has a slight overpressure, which is greater than the difference in the liquid pressure. Scrubbing liquid and possibly steam therefore emerge from the region 58'' in the direction of arrows 68.

The foregoing is a description corresponding in substance to German Application P 38 12 893.4, dated Apr. 18, 1988, the International priority of which is being claimed for the instant application, and which is hereby made part of this application. Any material discrepancies between the foregoing specification and the aforementioned corresponding German application are to be resolved in favor of the latter.

I claim:

1. Nuclear power plant, comprising a containment for the retention of radioactivity having an overpressure safety outlet; a filter connected to said outlet including a vessel for receiving a scrubbing liquid up to a given liquid level, a venturi scrubber disposed in said vessel having an outlet disposed above said given liquid level, an impact plate disposed at said outlet of said venturi scrubber for mist collection, a metal-fiber filter downstream of said venturi scrubber having at least first and second layers with a thickness of from 10 to 20 mm, said first layer being a moisture collector with a fiber thickness of from 8 to 20 $\mu$ and said second layer being an aerosol collector with a fiber thickness of from 2 to 7 $\mu$, and a mist collector downstream of said metal-fiber filter, said vessel having a top with a gas outlet downstream of said mist collector; and a stack connected to said gas outlet and leading to the atmosphere.

2. Nuclear power plant according to claim 1, including a drainage layer from 5 to 10 mm thick disposed downstream of said aerosol collector, said drainage layer being formed of fibers having fiber thicknesses of from 8 to 20 $\mu$.

3. Nuclear power plant according to claim 1, wherein said venturi scrubber has two inlet regions in scrubbing liquid below said given liquid level, being mutually spaced apart in flow direction by a given spacing.

4. Nuclear power plant according to claim 3, wherein said venturi scrubber has a given throat width, and said given spacing is at least twice said given throat width.

5. Nuclear power plant according to claim 1, including other venturi scrubbers, all of said venturi scrubbers being disposed at different heights in scrubbing liquid in said vessel.

6. Nuclear power plant according to claim 5, including a pipe being inclined relative to the horizontal, said venturi scrubbers being in the form of venturi nozzles attached to said pipe.

7. Nuclear power plant according to claim 6, wherein said venturi nozzles extend at right angles to said pipe at an inclination relative to the vertical.

8. Nuclear power plant according to claim 6, including another pipe inclined differently than said first-mentioned pipe, said pipes being disposed beside one another in said vessel.

9. Nuclear power plant according to claim 7, including another pipe inclined differently than said first-mentioned pipe, said pipes being disposed beside one another in said vessel.

10. Nuclear power plant according to claim 5, wherein said venturi scrubbers have different lengths and terminate in the same horizontal plane.

11. Nuclear power plant according to claim 6, wherein said venturi scrubbers have different lengths and terminate in the same horizontal plane.

12. Nuclear power plant according to claim 7, wherein said venturi scrubbers have different lengths and terminate in the same horizontal plane.

13. Nuclear power plant according to claim 8, wherein said venturi scrubbers have different lengths and terminate in the same horizontal plane.

14. Nuclear power plant according to claim 9, wherein said venturi scrubbers have different lengths and terminate in the same horizontal plane.

15. Nuclear power plant according to claim 1, wherein said vessel is a horizontal cylindrical vessel with a given maximum horizontal vessel width, said given liquid level is a maximum fill level, and said outlet of said venturi scrubber is disposed in the vicinity of said given maximum horizontal vessel width.

16. Nuclear power plant according to claim 1, including at least one other metal-fiber filter for absorbing flow forces, said metal-fiber filters being joined together in pairs.

17. Nuclear power plant, comprising a containment for the retention of radioactivity having an overpressure safety outlet; a filter connected to said outlet including a vessel for receiving a scrubbing liquid up to a given liquid level a venturi scrubber disposed in said vessel having an outlet disposed above said given liquid level, an impact plate disposed at said outlet of said venturi scrubber for mist collection, a metal-fiber filter downstream of said venturi scrubber having at least first and second layers, said first layer being a moisture collector and said second layer being an aerosol collector, and a mist collector downstream of said metal-fiber filter, said vessel having a top with a gas outlet downstream of said mist collector; and a stack connected to said gas outlet and leading to the atmosphere.

* * * * *